United States Patent [19]

Edgar

[11] 4,418,244
[45] Nov. 29, 1983

[54] BISTABLE SWITCH REMOTELY OPERABLE OVER TELEPHONE LINE

[75] Inventor: C. Mills Edgar, Marietta, Ga.

[73] Assignee: Solid State Systems, Inc., Marietta, Ga.

[21] Appl. No.: 390,182

[22] Filed: Jun. 21, 1982

[51] Int. Cl.³ .......................................... H04M 11/00
[52] U.S. Cl. ................................................ 179/2 A
[58] Field of Search ................... 179/2 A, 2 AM, 2 C, 179/84 C, 15 W, 6.07, 6.11; 340/825.73, 825.76

[56] References Cited

U.S. PATENT DOCUMENTS

| | | | |
|---|---|---|---|
| 3,548,102 | 12/1970 | Schaum | 179/2 |
| 3,859,462 | 1/1975 | Saxon | 179/2 A |
| 4,021,615 | 5/1977 | James et al. | 179/2 A |
| 4,107,466 | 8/1978 | Churchill | 179/2 A |
| 4,121,053 | 10/1978 | Dick | 179/2 A |
| 4,174,064 | 11/1979 | Pratt | 236/1 B |
| 4,221,936 | 9/1980 | Vaughn | 179/18 AD |
| 4,266,097 | 5/1981 | Cannon et al. | 179/2 A |
| 4,267,406 | 5/1981 | Perry | 179/2 A |
| 4,345,113 | 8/1982 | Shelley | 179/2 A |

Primary Examiner—G. Z. Rubinson
Assistant Examiner—W. J. Brady
Attorney, Agent, or Firm—Jones & Askew

[57] ABSTRACT

A bistable switch for controlling a latching relay for connecting and disconnecting an air conditioning load, operable over a telephone line by the application of a short burst of one of a pair of determined frequencies. The switch includes a power supply capacitor (35) charged directly from the telephone line (32, 33). A pair of narrow band filters (39, 40) each respond to one of the pair of frequencies. The output of each filter drives an FET amplifier (60) which in turn drives a charge pump (68, 69). When a sufficient amount of charge is received, the charge pump will provide a firing pulse to one of a pair of SCRs (77). The SCRs are each connected in one leg of a bridge circuit which includes one of a pair of diodes (79). The remaining legs of the bridge are formed by a pair of transistors (80) with the coil (46) of a bistable relay (47) attached across the bridge. The selective firing of one of the pairs of SCRs causes current to flow in one of the two possible directions (86, 87) through the coil either setting or resetting the relay.

6 Claims, 2 Drawing Figures

BISTABLE SWITCH REMOTELY OPERABLE OVER TELEPHONE LINE

TECHNICAL FIELD

The present invention relates to remotely operated switches operable over a telephone line and particularly shows a bistable remotely operated switch powered from the battery voltage conventionally available on a telephone line and operable when the subscriber set on the line to which the switch is connected is either on-hook or off-hook.

BACKGROUND OF THE INVENTION

For the last fifty years, the architecture of public buildings in the Western world has tended toward a design without windows which may be selectively opened by the occupants of various rooms and offices. The basic rationale was that climate control may be more easily effected without having to account for the idiosyncratic habits of various occupants of the building. In the last decade in the United States, the cost of energy to operate climate control equipment including heat and air conditioning has increased substantially.

While office buildings, schools and the like continue to be constructed with centralized climate control, most hotels and motels provide climate control selectively operable on a room-by-room basis. This commonly takes the form of window air conditioning or heat pump units provided in each room which may be operated by the occupant of the room to control the temperature and humidity therein.

Since hotel and motel rooms are almost uniformly rented at a flat rate per day, it has been difficult for the operators of these establishments to motivate their customers to be attentive to turning off climate control equipment when the room is unoccupied or when it is vacated. In particular, in the warmer climates a standardized "check-out time" tends to coincide with the warmest part of the day and many customers checking out of a hotel establishment will leave the air conditioning equipment on when they vacate the room.

Because of this confluence of construction practices and human habits, a number of designs for controlling climate control equipment remotely from a central location, particularly in hotels and motels, have been created. The common denominator of these designs is one which allows someone at a central control location, such as the desk of a hotel to turn off the climate control equipment when the room is vacated, and to turn it on upon the arrival of the next occupant.

Some arrangements have included switching schemes which required provision of separate wiring from the central location to the various rooms of the building. However, it is more common for arrangements for controlling climate control equipment on a room-by-room basis to be designed to be operable over a telephone network, particularly the extension lines of a private branch exchange (PBX) which are commonly found in such buildings. Since the conventional operation of hotels, motels and other buildings includes installation of a PBX telephone system, a number of switching arrangements have been designed to take advantage of the preexistence of the PBX network to turn air condition equipment on and off over the telephone lines. The present invention is an improved device of this type.

Previous switches controllable over the telephone lines have taken a number of forms. One arrangement uses a relay operable from the telephone line which is powered by charging a capacitor, inductively coupled to the telephone line when a ringing signal is placed on the phone line. When the ringing signal is applied, the inductive coupling provides charge to the capacitor which operates a break down device when the voltage reaches a predetermined level. Thus, power is supplied to the relay coil. The disadvantage of such an arrangement is that it requires a ringing signal to be applied to the telephone line to operate the device. If someone is present in the room and the ringing signal is applied, their natural inclination will be to answer the telephone unnecessarily, and possibly defeating operation of the device. The second disadvantage is that the device must be selectively decoupled when the room is occupied and the telephone is to be made available so that the application of a ringing signal indicates the actual existence of an incoming call.

Other arrangements have included rather complex tone control circuits in a time division multiplexing scheme for keeping the air conditioning equipment in selected rooms off. One such arrangement shows a circuit provided on each PBX extension in which receipt of a particular tone over the extension activates the monostable multivibrator to maintain a relay controlling the air conditioning equipment in an off state for a predetermined period of time. Failure to periodically reapply the tone signal to the PBX extension will cause the relay to drop off, thus allowing the air conditioning equipment to operate in a normal fashion. The basic disadvantage of such a system is that it requires that the PBX provide a rather complex signaling scheme for continuously applying the tone burst to the extension lines of unoccupied rooms in order to maintain equipment in its off state.

Furthermore, the device is disabled when the telephone goes off-hook. Thus, if employees of the establishment use the telephone extension for several minutes while the room is in an otherwise unoccupied state, the swiching device is disabled, and the air conditioning equipment may spuriously start up for several minutes. This constitutes a waste of the energy to operate the equipment since no effective cooling takes place.

Another arrangement uses the combination of a separate voltage source, often found to operate "message lights" on hotel telephones, combined with a reverse battery signal, to get a sum voltage sufficient to operate a relay to maintain the switch controlling the air conditioning in an off state.

Still another arrangement shows a remote control scheme remotely operable by conventional dual tone multifrequency tones. In this arrangement the remote control circuit must "answer" the telephone in order to respond to tones provided from the central location. Thus, it will be apparent that the device is inoperable when the telephone is in use.

Prior art tone operated devices have uniformly used signals within the normal band width of voice grade telephone lines. Thus, the use of such a switching device necessarily involves some interference with the normal function of the telephone. The prior art has not provided a remote switch controllable over a telephone line which is completely powered from the central office or PBX battery, and thus is strictly an add-on device requiring no separate external source of power. which provides control of climate conditioning equipment solely over preexisting telephone wiring; and which is operable irrespective of whether the telephone is on-hook or off-hook and which may further be operated when the telephone is in use without the user of the telephone having any awareness that the control function has taken place. Such an arrangement is provided by the present invention.

SUMMARY OF THE INVENTION

Broadly stated, the present invention is a bistable switch for controlling an external load through a pair of telephone conductors. The invention includes a device for storing energy derived from the voltage across a pair of telephone conductors, which is preferably a capacitor. Means for preventing the backward discharge of energy from the capacitor back to the telephone line when the voltage between the conductors drops is preferably embodied in the form of one or more diodes.

A bistable switching arrangement, including a control input and a set of contacts, preferably embodied by a DC bistable latching relay, is used with the contacts connected to the utilization equipment, usually an air conditioning or heating unit. The control input is of the type in which the contacts will close when current is passed through the control input in one direction and open when current is passed in the other direction through the control input. A pair of current controllers, each including an electronic switch, is provided to selectively cause current to flow through the control input in one of the two possible directions. Each of the current controllers will cause current to flow in a respective direction in response to receiving a firing signal which in the preferred embodiment, is a predetermined current into the gate of a silicon controlled rectifier.

The firing signal for each of the electronic switches is the buffered output of a filter circuit associated with each respective switch. Each respective filter has a characteristic frequency to which it responds. A buffering function is provided by circuitry which requires the characteristic frequency of the filter to be present on its input for a predetermined period of time before the firing signal is provided to the electronic switch. In the preferred form of the invention, the filters include ceramic crystals of characteristic frequencies which are not harmonically related and, preferably, both outside the range of normal audio frequencies and approximately one decade above the bandwidth of a conventional voice grade telephone line. The preferred form of the buffering arrangement includes an FET amplifier driving a charge pump charging a capacitor which controls the base to emitter voltage on a transistor switch which, in turn, ultimately provides the above-noted firing signal.

In view of the drawbacks with the prior art arrangements for providing remote switching on the telephone line, it is an object of the present invention to provide a remotely operable bistable switch operable over a pair of voice grade telephone line.

It is also an object of the present invention to provide such a switch which is completely powered from the telephone line and which draws little power therefrom, thus providing for a multiplicity of switches according to the present invention to be attached to extensions of a private branch exchange or subscriber lines from the central office without unduly loading the central office or PBX battery.

It is still a further object of the present invention to provide such a bistable switch which is operable irrespective of whether the telephone set attached to the same line is in use, and which may be operated while the telephone set is in use, without the parties to the conversation being aware of its operation.

Thus, it is a further object of the present invention to provide a bistable switch operable over telephone lines for which a controller may operate the switch through a control routine which is independent of whether the telephone set on each extension is currently on-hook or off-hook.

That the present invention fulfills the objects recited above will be appreciated from the detailed description of the preferred embodiment to follow.

DETAILED DESCRIPTION

Figure 1:
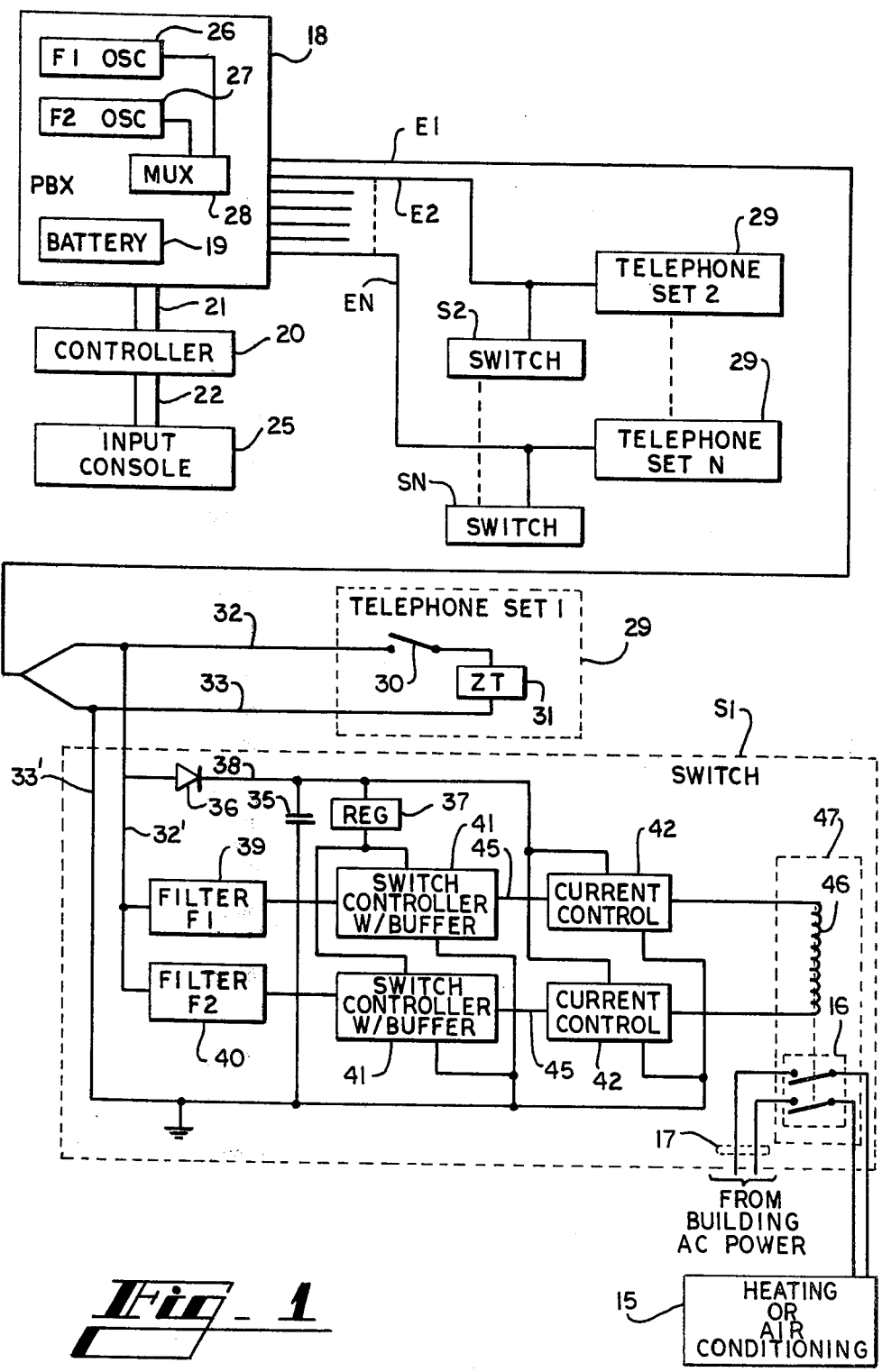
FIG. 1 is a block diagram of the preferred embodiment and the environment in which the inventor believes same will be most useful.

Turning now to the drawing figures in which like numerals designate like parts, the preferred embodiment of the present invention, which the inventor believes to be the best mode of practicing same, will now be described. In FIG. 1, the overall environment in which the present invention is used is shown. It should be understood that the system shown in FIG. 1 will normally reside in a relatively large building, including a plurality of locally controllable climate control units. Any arrangement of individual climate controlled units which may be operated by the closure of one or more sets of contacts may be controlled by the present invention.

The most common environment of the present invention is that of a hotel or motel air conditioning system wherein AC power to the air conditioning unit is the variable controlled by contact closure. Thus throughout the remainder of the specification, by way of example only, it is considered that the preferred embodiment is controlling the operation of heating or air conditioning unit 15 through the operation of contact set 16 shown in FIG. 1. In the preferred embodiment, connection and disconnection from AC power line 17 is a controlled variable.

Turning first to the system in which the preferred embodiment resides, a private branch exchange (PBX) 18 is provided. Included within the PBX is a battery 19 which should be understood to be the conventional DC supply for operating a telephone system. A controller 20 is connected via data bus 21 for operating the PBX. Controller 20 is a computer controlled device for both operating the normal PBX telephone functions and further for providing the appropriate signals described hereinbelow to control the present invention.

Attached to controller 20, as one of its input devices, is an input console 25 preferably connected to controller 20 by a serial link 22. In the environment of the present invention it is contemplated that, among other information to be provided to controller 20 through input console 25, is a status signal indicating whether a room to which a particular telephone extension is provided is occupied. In its preferred form, input console 25 takes the form of a conventional keyboard which may also have a CRT display associated therewith.

While it does not form part of the present invention per se, it should be understood that controller 20 could also include other computer functions associated with the business in which the PBX resides, and therefore may be programmed to automatically signal to each room which is indicated as unoccupied that the air conditioning equipment should be turned off.

Within PBX 18 is additional equipment for operating the present invention including f1 oscillator 26 and f2 oscillator 27. It should be understood that these blocks represent one of many known varieties of oscillators having distinct frequencies which may be selectively activated by an input enabling signal. Oscillators 26 and 27 are shown as connected to a multiplexer 28 which should be understood to be able to selectively connect the output of the oscillators to extension lines E1–EN under the control of controller 20.

Extension lines E1–EN simply represent N pairs of telephone conductors for N extentions from PBX 18. Attached to each one of extensions E1–EN is a respective one of N telephone sets 29. Also attached to each extension is one of switches S1–SN. It should be understood that each of these switches is identical and represents the preferred embodiment of the present invention.

Telephone set 1 is shown in slightly greater detail in that it includes a conventional hook switch 30 and a load presented to the extension represented as impedance 31. As is known to those skilled in the art, the closure of hook switch 30, when the telephone goes off-hook, connects the impedance 31 of the telephone set across the pair of telephone conductors lowering the voltage across the pair. Extension E1 is shown as broken out into its respective pair tip conductor 32 and a ring conductor 33. Connected in parallel with tip and ring conductors 32 and 33 is an input pair of conductors 32', 33', respectively.

Connected across the input conductors is a storage capacitor 35 which is charged through a rectifier shown as a diode 36 in series with input conduct 32'. Thus, capacitor 35 serves as a power source for the remaining circuitry of switch S1. A regulator 37 is attached to line 38 on the cathode side of rectifier 36. A pair of filters 39 and 40 have inputs connected to conductor 32'. The output of regulator 37 supplies power to a pair of switch controllers with a buffer 41 which should be understood to be identical. Each of switch controllers 41 is connected to one of an identical pair of current controllers 42 by an output line 45. In turn, each of current controllers 42 is attached to one side of a coil 46 of relay 47 which is used to turn on and off air conditioning unit 15.

It should be understood that when signals are provided from controller 20 to PBX 18 that relay 47 is to be placed in one of its two possible states, the appropriate one of oscillators 26 or 27 is activated which sends a signal of either frequency f1 or f2, respectively, out on extension E1. The appropriate one of filters 39 or 40 provides this signal to the buffered switch controller 41 connected to the filter. Once the signal from the oscillator has been present for a predetermined period of time between input conductors 32' and 33', a firing signal will be provided on the line 45 connected to the respective switch controller, which will in turn activate current controller 42. In response thereto, current is drawn through coil 46 of relay 47 in one of the two possible directions, either setting or resetting contacts 16 of relay 47.

Figure 2:
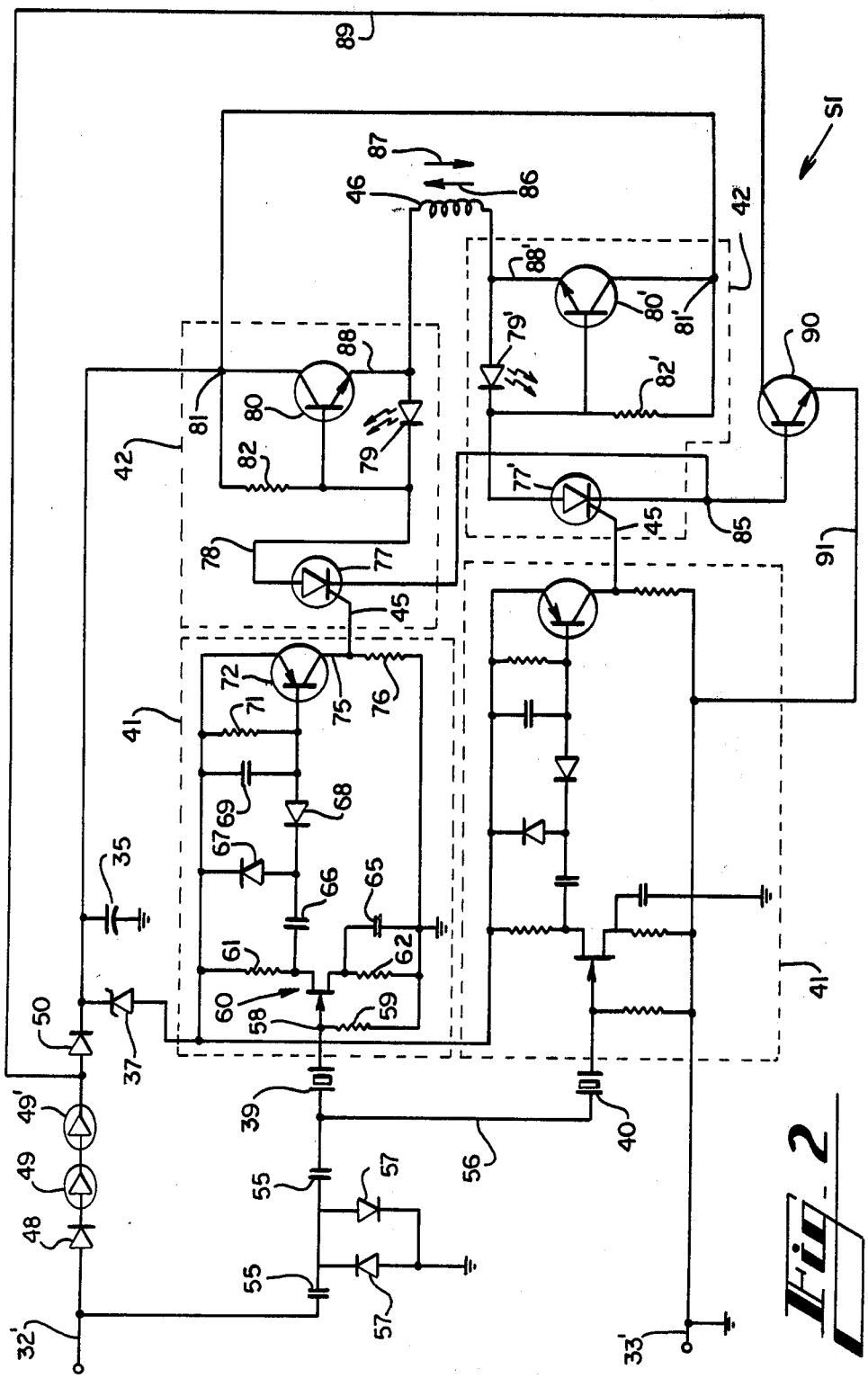
FIG. 2 is a circuit diagram of the preferred embodiment of the present invention.

Turning next to FIG. 2, a schematic diagram of the preferred embodiment of switch S1 (which is identical to switches S2–SN) is shown. In FIG. 2, the elements corresponding to the blocks in the block diagram of FIG. 1 are enclosed by dashed lines referenced by the same numerals as the blocks on FIG. 1. Note that buffered switch controllers 41 are identical and thus only one of these need be described in detail. The current control blocks 42 are also shown.

Input lines 32' and 33' form the input pair to switch S1. It should be understood that 32' is connected to tip conductor 32 (FIG. 1) and input line 33' is connected to ring conductor 33' which is normally 24 or 48 volts below the potential of 32' (when the telephone set is on-hook). Connected to line 32' is a series of diodes 48, 49 and 50. Diodes 49 are current limiting diodes which limit the maximum current flowing through the circuit between conductors 32' and 33'. The cathode of diode 50 is connected to point 51 which is electrically identical with line 38. Zener diode 37 is an embodiment of regulator 37 shown in FIG. 1 which performs a rudimentary voltage regulation function assuring a predetermined drop between points 51 and 52, thus limiting the voltage between point 52 and ground.

Capacitor 35 is an energy storage capacitor which is connected between the input pair 32' and 33' is grounded. Capacitor 35 is of a relatively large value (50 microfarads in the preferred embodiment) in order that sufficient charge to operate the switch may be stored. Any AC signal appearing between the input pair is capacitively coupled through blocking capacitors 55 to line 56 which is the input point for filters 39 and 40.

In the preferred embodiment, filters 39 and 40 are embodied by ceramic crystal filters of distinct frequencies f1 and f2. In the preferred embodiment, frequency f1 is 38.4 kHz and characteristic frequency f2 of filter 40 is 32.77 kHz. It will be appreciated by those skilled in the art that ceramic crystals of this type are high Q piezoelectric elements, each having a characteristic pass band. Because, in embodiments of the present invention, these filters have such a high quality factor (Q) and their center frequencies are spaced by an excess of 5 kHz, it will be appreciated that each of these filters has a characteristic pass band distinct from the other filter.

As noted hereinabove, it is preferable that embodiments of the preferred invention be constructed wherein filters 39 and 40 have characteristic pass bands above the normal range of human hearing, but embodiments of the invention using audible tones could be constructed.

A pair of back-to-back diodes 57 limits the voltage swing between line 56 and ground to approximately 0.7 of a volt in order to protect crystal filters 39 and 40 from mechanical damage.

Assume for the moment that a signal at the center frequency f1 of filter 39 is applied between input pair 32', 33'. The operation of the buffered switch controller 41 connected to filter 39 will now be described. It will be apparent that operation of the other of the switch controllers 41 is identical when a signal within the pass band of filter 40 is applied thereto. The output from crystal filter 39 is provided to point 58. Between point 58 and ground is a biasing resistor 59 used to develop input voltage to the gate terminal of n channel field effect transistor (FET) 60. Drain and source resistors 61 and 62 are connected so that a conventional amplifier is constructed around FET 60. A bypass capacitor 65 is used in a conventional manner to bypass AC components in the source circuit and to maintain and DC bias on the source terminal of FET 60.

The amplifier built around transistor 60 and diodes 67 and 68 comprises a charge pump for charging capacitor 69 when a signal within the characteristic pass band of crystal filter 39 is applied between input pair 32' and 33'. When an alternating signal appears at point 58, this signal will be amplified and the voltage at the drain terminal of transistor 60 will alternately rise and fall. This signal is coupled through capacitor 66 and, as current flows through resistor 61, diode 68 will become forward biased allowing current to flow through capacitor 69. When the input signal to the amplifier raises the voltage at the drain terminal of transistor 60 back toward the level at point 52, diode 68 cuts off and capacitor 69 will discharge through resistor 71. Selection of appropriate values for capacitor 69 and resistor 71 perform the buffering function which assures that the input signal at point 58 must be present for a predetermined period of time before a predetermined voltage is developed across resistor 61, and thus from the emitter to base of transistor 72. When the base of transistor 72 becomes sufficiently negative with respect to its emitter, transistor 72 will turn on and current will begin flowing in line 75. A conventional gate resistor 76 is connected between ground and gate 45 of SCR 77.

The elements within dashed line 42 are the preferred embodiment of the current control arrangement shown as block 42 in FIG. 1. It should be understood that the presence of sufficient current flowing into the gate terminal 45 of SCR 77 constitutes a firing signal to SCR 77 which is an electronic switch.

The two current controllers 42 control the direction in which current flows through coil 46 of latching relay 47 (FIG. 1). Only the coil 46 is shown in FIG. 2. It will be appreciated from inspection of FIG. 2, that the current control circuits 42 are arranged in a bridge, with coil 46 being across the bridge, and in which SCRs 77 and 77' comprise two electronic switches for selectively connecting other elements in the bridge to a common node at point 85.

Continuing with the example of a signal which passes through crystal filter 39, operation of current control circuits 42 will be explained. When capacitor 69 has accumulated sufficient charge, a firing signal is applied to gate terminal 45 of SCR 77. This will cause SCR 77 to fire, connecting line 78 to point 85. Note that points 81 and 81' are electrically identical and constitute one node of the aforementioned bridge. When SCR 77 is fired, point 81', which is connected to line 38, will be at a potential equal to the voltage across capacitor 35. Since SCR 77' remains cut off, the base of transistor 80' is floating with respect to its emitter (isolated by LED 79'). Current from point 89', flowing through resistor 82', will enter the base terminal of transistor 80' turning the transistor on. Current will flow from point 81' through the transistor to line 88'. From there, current will flow through coil 46 in the direction of arrow 86 on through LED 79, line 78, SCR 77 to point 85.

The flow of current in the direction of 86' through coil 46 will cause the contacts 16 of relay 47 (FIG. 1) to assume a first state. It should be appreciated that the flow of current through coil 46 in the direction of arrow 87 will cause the contacts to assume a second state. Thus, current flowing through coil 46 in the direction of arrow 86 is considered a flow of current in a set direction, and arrow 87 is considered to define a reset direction.

From the foregoing it will be appreciated that embodiments of the invention using dual coil latching relays may also be constructed. In such an arrangement, current through one coil will be current in a set direction and current through the other coil is considered to flow in the reset direction.

Note that under the conditions described above, line 78 was connected to what will be considered effectively a ground for the bridge circuit at point 85. This being the case, the base of transistor 80 is effectively grounded. As current begins flowing through LED 79, the forward voltage drop across this LED acts as a battery to drive the base of transistor 80 negative with respect to the emitter 88. Thus, the base-emitter junction of transistor 80 becomes reverse biased and no current will flow from point 81 to line 88. In this manner, the bridge is arranged so that the grounding of one leg at point 85 assures that current will flow through one arm of the bridge, through coil 46 in a predetermined direction, and through the grounded leg of the bridge which consists of one of LEDs 79 or 79'.

It will be appreciated from the symmetry of the bridge circuit of current controllers 42 that the application of a firing signal to the gate of SCR 77' in response to a signal passing through crystal filter 40 will have the effect of driving current through coil 46 in the direction of arrow 87 with transistor 80 conducting and transistor 80' remaining cut off.

Transistor 90 is provided as an arrangement to assure sufficient discharge of capacitor 35 so that when the device is operated, the current through the particular one of SCRs 77 or 77' which was fired will fall below the holding current and assure SCR cut off. When the above-described sequence of events has taken place, there will be a large current in rush from point 85 into the base of transistor 90 causing this transistor to saturate. The collector of transistor 90 is connected to the junction between diode 49' and diode 50 by line 89. The emitter is connected by line 91 to ground potential at input line 33'.

Thus, when one of the SCRs fires, transistor 90 turns on and becomes saturated. This will reverse bias diode 50 and will connect line 32' to line 33' through saturated transistor 90, the current flowing through this loop being determined by current limiting diodes 49 and 49'. With diode 50' being reverse biased, capacitor 35 cannot be recharged from the input pair until transistor 90 becomes cut off. Thus, capacitor 35 will continue to discharge through line 38 and current control circuits 42 to point 85 until the current in the fired SCR drops below the SCR holding current causing it to cut off. When this occurs, no more current is injected at point 85 and thus transistor 90 cuts off, terminating the reverse biased condition of diode 50 and thus allowing capacitor 35 to recharge from the input pair.

Lastly, consider that capacitor 35 is charged to some steady state voltage, for example 48 volts, when the telephone set 1 is on-hook. Next consider that the telephone set goes off-hook closing switch 30 shunting the line with the telephone's impedance 31 (FIG. 1). It may be seen by inspection of FIG. 2 that if all devices were ideal, capacitor 35 would never discharge unless a firing pulse is provided on one of gate terminals 45. However, in practice it has been discovered that the charge of capacitor 35, with the values shown in the table below used to construct an embodiment, will remain sufficient two to three minutes after telephone set 1 has been lifted off-hook to still operate the device when the telephone is in use. It is believed that the primary leakage paths are the forward blocking current of SCR 77 through resistors 82.

The values and device types of the components used in constructing the preferred embodiment shown in FIG. 2 are given in the following table.

TABLE

| Reference Number | Value or Device Type |
|---|---|
| Resistors | Ohms |
| 59 | 10M |
| 61, 62 | 100K |
| 71 | 510K |
| 76 | 10K |
| 82 | 4.7K |
| Capacitors | Microfarads |
| 35 | 50 @ 100 v. |
| 55 | 0.0003 |
| 65, 69 | 0.1 |
| 66 | 0.001 |
| Diodes | |
| 37 | 1N4749 |
| 48, 50, 57, 67, 68 | 1N914 |
| 49 | 1N5294 |
| Transistors | |
| 60 | 2N5485 |
| 72 | 2N2907 |
| 80, 90 | 2N5550 |
| SCRs | |
| 77 | 2N5061 |
| Relay | |
| 47 | Potter Brumfield KUL11D 15S/12 |

It will be appreciated from the foregoing description of the preferred embodiment that the present invention accomplishes the objects set forth above, and provides a remote switch for operation from a telephone line which may be used solely as an add-on device to a PBX telephone system, which may be operated irrespective of whether the telephone is on-hook or off-hook and without interfering with any telephone conversation occuring while the switch is operated. Furthermore, the foregoing description of the invention will suggest other embodiments to those skilled in the art and therefore the scope of the present invention is to be limited only by the claims below.

I claim:

1. A bistable switch for controlling an external load through a pair of telephone conductors comprising in combination:

an input pair of conductors for providing a connection to said pair of telephone conductors;

a passive energy storing means connected between said input pair for storing charge;

a bistable relay including a coil arrangement and a set of contacts characterized by said set of contacts assuming a first state in response to current flowing through said coil arrangement in a set direction and said contacts assuming a second state in response to current flowing said coil arrangement in a reset direction;

current control means including a pair of electronic switches connected to said coil arrangement and to said passive energy storage means, one of said pair being connected to conduct current in said set direction in response to receiving a firing signal, and the other of said pair being connected to said coil arrangement to conduct current in said reset direction, in response to receiving said firing signal;

a pair of switch controllers, each connected to a respective one of said electronic switches, and each comprising an input connected to said pair of telephone conductors, a filter connected to said input having a characteristic pass band distinct from the filter of the other of said pair of said switch controllers; and buffering means connected to said filter for providing said firing signal to said respective one of said electronic switches in response to the presence of a signal on said pair of telephone conductors having a frequency within said characteristic pass band, for a predetermined period of time.

2. A bistable switch as recited in claim 1 wherein said characteristic pass band for each filter of said pair of switch controllers includes a center frequency greater than 15,000 hertz.

3. A bistable switch as recited in claim 1, wherein said passive energy storage means is a capacitor and further comprising means for preventing discharge of said capacitor back through said input pair when the voltage between said pair of telephone conductors drops below the voltage across said capacitor.

4. A bistable switch as recited in claim 1 wherein said electronic switches each comprises a silicon controlled rectifier.

5. A bistable switch as recited in claim 1 wherein said pair of switch controllers comprises a four legged bridge circuit, two legs of said bridge circuit each comprising a transistor connected at a common input mode, the remaining two legs of said bridge circuit each comprising a diode in series with one of said electronic switches, one terminal of each said diode being connected to one of said transistor at one of a pair of side nodes, and wherein said coil arrangement is connected across said side nodes of said bridge circuit.

6. A bistable switch as recited in claim 1, wherein said filters are ceramic crystals.

* * * * *